April 30, 1929.  P. O. GIBSON  1,711,451

ROLLER SKATE

Filed Feb. 20, 1928  2 Sheets-Sheet 1

Inventor
Percy O. Gibson

By  
Attorney

April 30, 1929.   P. O. GIBSON   1,711,451
ROLLER SKATE
Filed Feb. 20, 1928   2 Sheets-Sheet 2

Inventor
Percy O. Gibson

By
Attorney

Patented Apr. 30, 1929.

1,711,451

UNITED STATES PATENT OFFICE.

PERCY O. GIBSON, OF KOKOMO, INDIANA.

ROLLER SKATE.

Application filed February 20, 1928. Serial No. 255,582.

The present invention pertains to a novel roller skate and is directed particularly to the wheel supporting construction which permits a slight convergence or divergence of the two axles in order that the skate may be caused to take a curved path when pressure is applied on one edge or the other of the skate.

This mode of operation requires that the axle, or axle mounting, be balanced by a resilient means which normally retains the axles in parallel relation, but which permits the variation already mentioned. Hitherto rubber pads have been used for these purposes, but rubber becomes hard with age and thus loses its utility for this function. Moreover, it is likely to deteriorate further under rough and constant usage.

The present invention comprises an improvement in the resilient means for positioning the axle and involves the use of a spring construction instead of rubber. It will be apparent that due to the permanent nature of a spring, the difficulties arising from the use of rubber pads are overcome.

The invention further includes a novel device for changing the radius of curvature of the inner wheels with respect to the radius of curvature of the outer wheels, or vice versa on application of pressure to one or the other edge of the skate. This construction comprises essentially an axle mounting or bearing pivoted on a supporting member which slopes towards an end of the skate. As the bearing member is turned on its pivot, one of the wheels will ascend and the other will descend with respect to the slope of the supporting member, whereupon the ascending and descending wheels move respectively inwardly and outwardly of the skate, so that the two pairs of aligned wheels assume different radii of curvature.

The invention is fully disclosed by way of example in the following description and in the accompanying drawings, in which—

Reference to these views will now be made by use of like characters which are employed to designate corresponding parts throughout.

Figure 1:
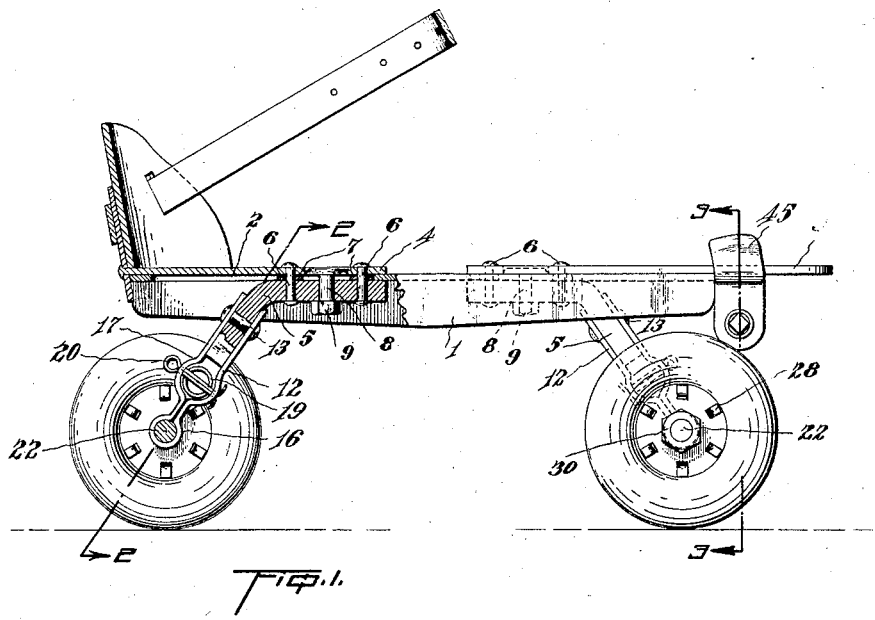
Figure 1 is a side elevation of the skate, partly in section.

The base or body member of the skate consists of a somewhat elongated extension bar 1 of channel formation and having a pair of longitudinal slots 2. This bar is disposed in inverted position, i. e., with the sides of the channel pointing downwardly, and upon the same are placed a sole plate 3 and a heel plate 4. Beneath the bar are positioned a pair of supporting members or stay brackets 5, one for each end of the skate. These brackets are of angular formation, one leg of each being disposed horizontally and in contact with the bar 1, while the other leg slopes downwardly and outwardly towards the corresponding end of the skate. The assembly of the parts thus far described, is made by rivets 6 connecting the plates 3 and 4 to the respective brackets 5 and passing loosely through the slots 2. Each rivet is surrounded by a washer 7 within the slot in order to avoid clamping the parts together. The assembly further includes a headed bolt 8 passed through each plate and corresponding slot 2 into the corresponding bracket. The bracket is entirely penetrated by the bolt as shown in Figure 1, and the lower end thereof receives a nut 9.

Figure 6:
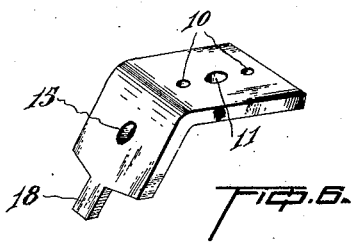
Fig. 6 is a perspective view of the support or stay bracket.
Figure 7:
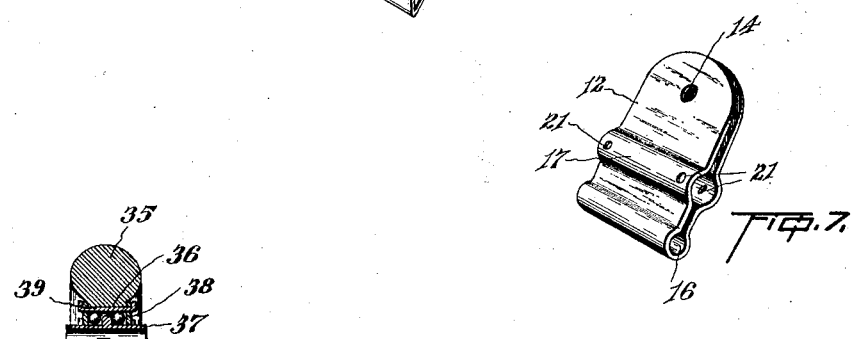
Fig. 7 is a perspective view of the axle brace.

It will be apparent from the foregoing description that the rivet connections permit adjustment of the plates 3 and 4 longitudinally of the channel extension bar, while the adjustment may be secured by the bolt and nut device 8, 9. Each bracket is suitably apertured at 10 for receiving the rivets and at 11 for receiving the bolt as clearly shown in Figure 6.

To each is attached an axle brace in the form of a substantially U-shaped clip 12 receiving the sloping end of the bracket between its free ends. A pivotal attachment between the parts is made by passing a rivet 13 through apertures 14 in the sides of the clip and a coinciding aperture 15 in the bracket. The saddle of the clip is formed as a bearing 16 for receiving an axle as presently to be described, while the sides of the clip are bent outwardly to form a boss 17 intermediate their ends. A lug 18 extends from the lower end of the bracket 5 into the longitudinal center of the boss 17. A pair of springs 19 are received in the boss and have their outer ends secured thereto by cotter pins 20 passed through apertures 21 formed in the boss. The inner ends of the spring bear freely on opposite sides of the lug 18, and being of equal strength, balance the brace with respect to its pivotal connection to the bracket.

Figures 2, 3:
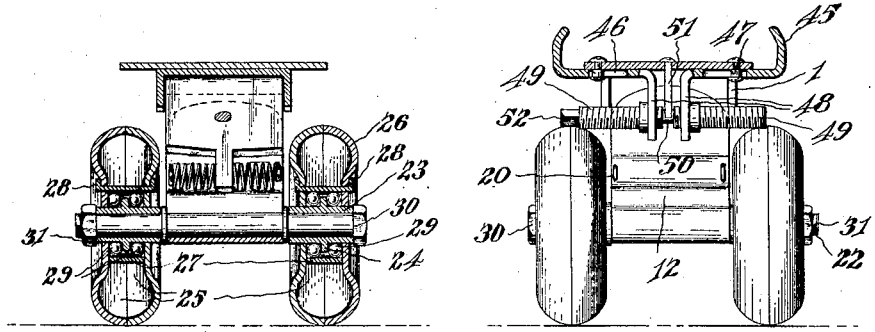
Fig. 2 is a section on the line 2—2 of Figure 1.
Fig. 3 is a section on the line 3—3 of Figure 1.
Figure 4:
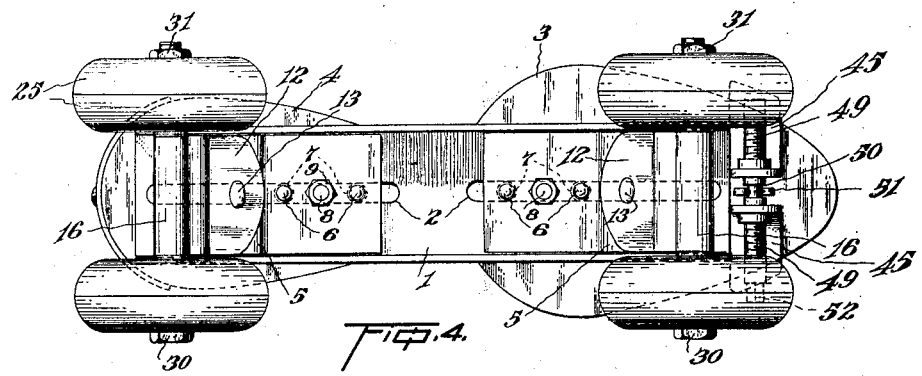
Fig. 4 is a bottom plan view of the skate.
Figure 5:
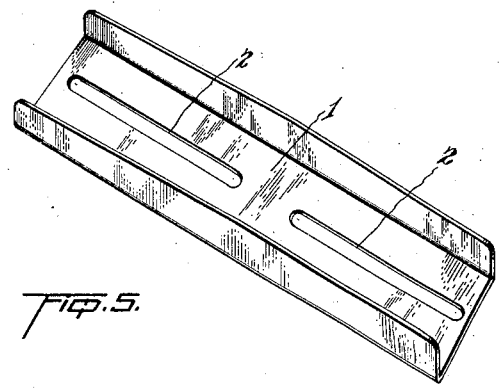
Fig. 5 is a perspective view of the channel bar.

The bearing of each brace receives an axle 22 over the ends of which are passed bearing sleeves 23 as shown more clearly in Figure 2. Each said sleeve has a central collar 24 which forms a double race for ball bearings. The wheel proper consists of a pair of matched semisections 25 bulged at 26 at the rim in order to present the appearance of a balloon tire. The sections are clamped together by a sleeve 27 disposed therein concentric with the axle and having lugs 28 passed through the sides of the sections and bent into engagement with the outer surfaces. This sleeve further completes the double ball race which contains two series of ball bearings 29. In order to prevent the sleeves 23 from slipping, the axle 22 is formed at one end with a bolt head 30 and receives at its other end a nut 31.

Figure 8:
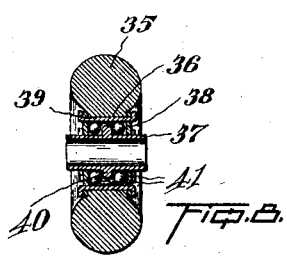
Fig. 8 is a sectional view of a modified form of wheel.

A modified form of wheel is shown in Figure 8 wherein the half sections are replaced by a solid body or tire 35 of wood or hard rubber. This member has a hollow center 36 for receiving the sleeve 37 which fits over the axle. Apertured plates 38 are applied to the sides of the body, over the opening 36 and receive the end fingers of a sleeve 39 in the manner described in connection with the previous modification. The sleeve 37 has a central collar 40, which, in conjunction with the sleeve 39 forms a double race for receiving two series of ball bearings 41.

The sole plate 3 is provided with a pair of toe clips 45 each having a slot 46 receiving a rivet 47 fixed in the plate. The clips have depending portions 48 which receive oppositely threaded screws 49 joined by a central neck 50. A fork 51 secured to the plate 3 straddles the neck and thus prevents the screw from shifting axially. Consequently, on turning the screw by application of a suitable tool to the squared end 52 thereof, the clips will be adjusted relative to the plate 3.

The action of the wheels in describing a curved path will now be described. It is natural for the skater to exert pressure along the edge of the skate corresponding to the direction in which he is about to turn. Such pressure will tilt a side of the skate and also the supporting brackets 5. There will be a pivotal movement of the brackets with respect to the braces 12, and on the pressure side, the braces will be moved upwardly on the sloped parts of the brackets. The upwardly moving wheels will be drawn together, owing to the fact that the sloped parts of the bracket converge upwardly; and in like manner the remaining pair of wheels will be spread inasmuch as they are relatively descending the sloping parts of the brackets. The wheels at the pressure side are thus brought into a line which has a smaller radius of curvature than the corresponding line of the remaining wheels, and the skate will obviously describe a curve until the pressure is relieved. It will be noted that any such pressure compresses one of the springs 19, so that on relief of such pressure, the braces 12 will immediately be balanced with respect to the brackets 5. The life of the springs is of indefinite duration as distinguished from the rubber pads hitherto used, which deteriorate through hardening as already stated.

Although specific embodiments of the invention have been illustrated and described, it will be understood that various alterations in the details of construction may be made without departing from the scope of the invention as indicated by the appended claims.

What I claim is:—

1. In a roller skate, a base, a supporting bracket attached to said base, an axle brace pivotally attached to said bracket, an axle journalled in said brace, wheels on said axle, a lug extending from said bracket, and aligned springs carried by said brace and bearing on opposite sides of said lug, whereby the brace is balanced with respect to its pivotal connection to said bracket.

2. In a roller skate, a base, a supporting bracket attached to said base, said bracket sloping outwardly towards an end of said base, an axle brace pivotally attached to said bracket, an axle journalled in said brace, wheels on said axle, a lug extending from said bracket, and aligned springs carried by said brace and bearing on opposite sides of said lug, whereby the brace is balanced with respect to its pivotal connection to said bracket.

3. In a roller skate, a slotted extension bar, supporting brackets for wheeled structures disposed beneath the bar and supporting the same, sole and heel plates mounted on said bar and riveted to the brackets through the slots of the bar, whereby the said brackets are rendered adjustable with the plates along said bar, axle braces pivoted to said brackets, an axle journalled in each brace, a pair of wheels on each axle, and springs carried by said braces and engaging a part of the brackets to balance the braces with respect to their pivotal connections to the brackets.

4. In a roller skate, a slotted extension bar, supporting brackets for wheeled structures disposed beneath the bar and supporting the same, sole and heel plates mounted on said bar and riveted to the brackets through the slots of the bar, whereby the said brackets are rendered adjustable with the plates along said bar, axle braces pivoted to said brackets, an axle journalled in each brace, a pair of wheels on each axle, and springs carried by said braces and engaging a part of the brackets to balance the braces with respect to their pivotal connections to the brackets, said brackets diverging downwardly and outwardly towards the ends of said bar.

5. In a roller skate, a base, a supporting bracket attached to said base, an axle brace pivoted to said bracket, an axle journalled in said brace, wheels carried by said axle, a boss formed in said brace, a lug extending centrally from said bracket into said boss, a pair of springs aligned in said boss, said springs having their outer ends fixed to said boss and their inner ends bearing on opposite sides of said lug, whereby to balance the brace with respect to its pivotal attachment to the bracket.

6. In a roller skate, a base, a supporting bracket attached thereto, a substantially U-shaped axle brace receiving an end of said bracket and pivoted thereto, a bearing and a boss formed in said brace, an axle journalled in said bearing, wheels mounted on said axle, a central lug extending from said bracket into said brace, a pair of springs aligned in said boss, said springs having their outer ends fixed to said boss and their inner ends bearing on opposite sides of said lug, whereby to balance the brace with respect to its pivotal attachment to the bracket.

In testimony whereof I affix my signature.

PERCY O. GIBSON.